United States Patent
Sutehall et al.

(10) Patent No.: US 10,416,402 B2
(45) Date of Patent: Sep. 17, 2019

(54) AERIAL OPTICAL AND ELECTRIC CABLE ASSEMBLY

(71) Applicant: PRYSMIAN S.p.A., Milan (IT)

(72) Inventors: Ralph Sutehall, Milan (IT); Martin Vincent Davies, Milan (IT)

(73) Assignee: PRYSMIAN S.p.A., Milan (IT)

( * ) Notice: Subject to any disclaimer, the term of this patent is extended or adjusted under 35 U.S.C. 154(b) by 0 days.

(21) Appl. No.: 15/576,342

(22) PCT Filed: May 27, 2015

(86) PCT No.: PCT/EP2015/061645
§ 371 (c)(1),
(2) Date: Nov. 22, 2017

(87) PCT Pub. No.: WO2016/188570
PCT Pub. Date: Dec. 1, 2016

(65) Prior Publication Data
US 2018/0172936 A1    Jun. 21, 2018

(51) Int. Cl.
*H01B 7/02* (2006.01)
*G02B 6/44* (2006.01)
(Continued)

(52) U.S. Cl.
CPC ........... *G02B 6/4422* (2013.01); *G02B 6/443* (2013.01); *H01B 7/0216* (2013.01); *H01B 9/005* (2013.01);
(Continued)

(58) Field of Classification Search
CPC .......... H01B 5/105; H01B 7/04; H01B 7/226; H01B 7/0045; H01B 7/043; H01B 7/1825;
(Continued)

(56) References Cited

U.S. PATENT DOCUMENTS 4,052,911 A * 10/1977 Feldstein ................. F16C 1/26
74/502.5
4,097,119 A *  6/1978 Kumamaru ............ G02B 6/441
385/101
(Continued)

FOREIGN PATENT DOCUMENTS

EP     1 881 509 A2    1/2008
GB     2 230 106 A    10/1990

OTHER PUBLICATIONS

BS EN 50290-2-23-2013, "Communication cables—Part 2-23: Common design rules and construction—Polyethylene insulation for multi-pair cables used in access telecommunication networks: Outdoor cables", BSI Standards Publication, 2013, 14 pages.
(Continued)

*Primary Examiner* — William H. Mayo, III
*Assistant Examiner* — Krystal Robinson
(74) *Attorney, Agent, or Firm* — Oblon, McClelland, Maier & Neustadt, L.L.P.

(57) ABSTRACT

It is disclosed a cable assembly comprising a common figure-8 outer jacket comprising a first lobe and a second lobe, wherein the first lobe surrounds an electric core with a relevant first extruded inner sheath housing a strength member; and the second lobe surrounds an optical core with a relevant second extruded inner sheath.

20 Claims, 1 Drawing Sheet

(51) Int. Cl.
*H01B 9/00* (2006.01)
*H01B 11/22* (2006.01)
*H01B 11/00* (2006.01)

(52) U.S. Cl.
CPC ............ *H01B 11/22* (2013.01); *G02B 6/4486* (2013.01); *G02B 6/4495* (2013.01); *H01B 11/007* (2013.01)

(58) Field of Classification Search
CPC ...... H01B 11/22; H01B 13/0016; H01B 1/22; H01B 9/006; H02G 15/06; H02G 15/18; H02G 7/04; H02G 7/056
USPC ....................................... 174/71 R
See application file for complete search history.

(56) References Cited

U.S. PATENT DOCUMENTS

| | | | | |
|---|---|---|---|---|
| 4,447,122 A * | 5/1984 | Sutehall | ............... | G02B 6/4416 |
| | | | | 174/113 A |
| 4,763,983 A * | 8/1988 | Keith | ................... | G02B 6/4422 |
| | | | | 156/158 |
| 5,189,718 A | 2/1993 | Barrett et al. | | |
| 5,469,523 A | 11/1995 | Blew et al. | | |
| 5,636,305 A * | 6/1997 | Warner | .................. | G02B 6/447 |
| | | | | 385/100 |
| 5,651,081 A * | 7/1997 | Blew | .................... | G02B 6/4403 |
| | | | | 385/101 |
| 5,740,295 A * | 4/1998 | Kinard | .................. | G02B 6/441 |
| | | | | 385/103 |
| 5,777,260 A | 7/1998 | Klumps et al. | | |
| 6,169,834 B1 * | 1/2001 | Keller | .................... | H01B 11/22 |
| | | | | 385/101 |
| 6,236,789 B1 * | 5/2001 | Fitz | ...................... | G02B 6/4416 |
| | | | | 385/100 |
| 6,356,690 B1 * | 3/2002 | McAlpine | ............ | G02B 6/4422 |
| | | | | 385/100 |
| 6,363,192 B1 * | 3/2002 | Spooner | ............... | G02B 6/4416 |
| | | | | 174/115 |
| 6,546,175 B1 * | 4/2003 | Wagman | ............... | G02B 6/4405 |
| | | | | 385/113 |
| 9,977,208 B2 * | 5/2018 | Huegerich | ............. | G02B 6/426 |
| 2005/0002622 A1 * | 1/2005 | Sutehall | ............... | H02G 3/0487 |
| | | | | 385/101 |
| 2005/0013565 A1 * | 1/2005 | Mohler | ................. | G02B 6/4422 |
| | | | | 385/113 |
| 2008/0304798 A1 * | 12/2008 | Pavan | .................. | C08L 23/0869 |
| | | | | 385/110 |
| 2013/0084047 A1 * | 4/2013 | Baucom | ................... | G02B 6/44 |
| | | | | 385/114 |
| 2013/0287349 A1 * | 10/2013 | Faulkner | ................ | H01B 11/22 |
| | | | | 385/101 |

OTHER PUBLICATIONS

IEC 60228-2004-3rd ed., "*Conductors of Insulated Cables*", International Electrotechnical Commission, 2004, 23 pages.
International Search Report dated Aug. 2, 2016 in PCT/EP2015/061645, filed on May 27, 2015.

* cited by examiner

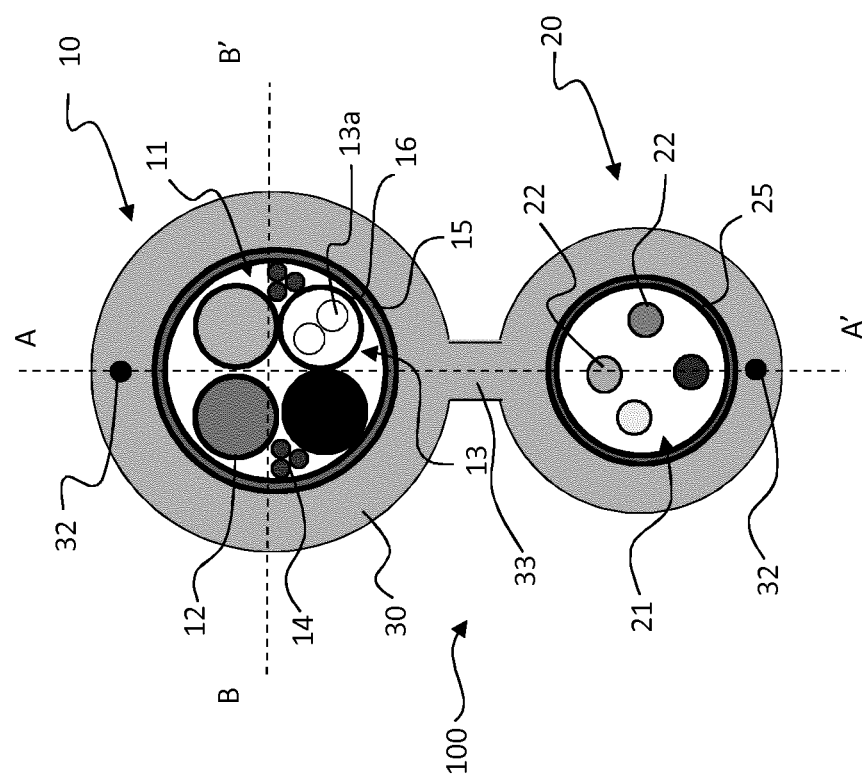

AERIAL OPTICAL AND ELECTRIC CABLE ASSEMBLY

BACKGROUND

The present invention relates to the field of cables. In particular the present invention relates to a cable assembly comprising both a number of optical conductors and a number of electric conductors. The cable assembly of the present invention is adapted to be used as drop cable in FTTH (Fiber To The Home) aerial applications for single buildings (for instance a house) or multiple dwelling units.

PRIOR ART

GB 2 230 106 A discloses a composite electric and optical aerial cable especially suitable for use as a drop cable for extending between an aerial electric and optical cable installation and a building. It is of a figure-of-eight transverse cross-section and has, in one lobe of the cable, at least one flexible reinforcing element and insulated electric conductors and, in the other lobe of the cable, an optical fibre element. In one lobe there are embedded electrically insulated elongate electric conductors and electrically insulated elongate metal reinforcing elements twisted together. The insulated electric conductors and the insulated reinforcing elements are bound together by a helically lapped plastics tape. The optical fibre element may consist of a plastics tube which is separately formed with respect to the lobe and in which optical fibres are loosely housed or it may comprise at least one tightly buffered optical fibre embedded in the lobe.

U.S. Pat. No. 5,740,295 discloses a composite drop cable comprising a dielectric optical drop cable and a copper cable containing twisted copper wire pairs enclosed within a metallic core tube and encased within a polyvinylchloride (PVC) jacket. The two cables are encased in a jacket or sheath of, for example, low density polyethylene and the entire assembly forms the composite cable. The dielectric fiber drop cable comprises a core tube of a polymeric material containing fibers. A plurality of dielectric strength members, are disposed around the circumference of the core tube. The assembly is then encapsulated in a jacket of insulating material.

SUMMARY OF THE INVENTION

In some circumstances it is convenient to separate composite electric and optical aerial cables into an electric cable and into an optical cable. The separation can be useful, for instance, when the electric cable enters a building through a certain duct or opening while the optical cable enters the building through a different duct or opening, or when the electric cable and the optical cable follow different paths from a certain position on, in order to reach relevant users.

To this purpose, it is convenient to obtain two self-standing cables from the original composite electric and optical aerial cable. The two self-standing cables should conveniently have a substantially circular cross-section with a relatively small diameter. Such two characteristics allow inserting each self-standing cable in tubes, possibly already existing in the building, which may be of a rather small diameter and at least partially occupied by other cables.

The Applicant has noticed that the prior art composite electric and optical aerial cables, such as the one of GB 2 230 106 A, are unsuitable for obtaining self-standing optical and electric cables having the above characteristics. As a matter of fact, these cables have an outer jacket not configured for being removed, and in case the web connecting the two lobes is cut in order to part electric and optical cables, it can leave residues on both the first and second lobe. These web residues make the cross-section and outer surface of the separated lobes irregular and the cable installation may be difficult, for example in case one of the cables becomes blocked in a duct or narrow passage.

In the above, the Applicant has tackled the problem of providing an aerial optical-copper cable assembly which is lightweight and with a rather reduced cross-section, adapted to be easily divided into an independent optical cable and an electric cable suitable to be separately routed and deployed in an effortless manner.

The Applicant has found a cable assembly comprising an optical core and an electric core each provided with an independent extruded sheath surrounded by a removable a common figure-8 outer jacket.

By "common figure-8 outer jacket" it is meant a jacket having portions surrounding the optical core and the electric core respectively, connected by a web portion.

Once the common figure-8 outer jacket has been removed, each of the optical core and electric core, with the relevant extruded inner sheath, forms a two self-standing cable having its own sheath with a thickness suitable for protecting the cable itself during the deployment and having a substantially circular cross-section, free of projecting parts deriving from the cable assembly partition.

As the common figure-of-8 outer jacket can be fully removed, the resulting two self-standing cables have a reduced diameter while maintaining a suitable mechanical resistance. Both the characteristics render them adapted to be laid in existing ducts, possibly following a tortuous path.

According to a first aspect, the present invention provides a cable assembly comprising a common figure-8 outer jacket comprising a first lobe and a second lobe, wherein the first lobe surrounds a first extruded inner sheath housing an electric core and a strength member; and the second lobe surrounds a second extruded inner sheath housing an optical core.

Advantageously, the common figure-8 outer jacket embeds a rip-cord, preferably a rip-cord per each first and second lobe. Preferably, the rip-cord of the first lobe and the rip-cord of the second lobe are embedded into the common figure-8 outer jacket at diametrically opposed positions.

The first and second extruded inner sheaths preferably have a thickness of at least 0.2 mm.

In the cable assembly of the invention the common outer jacket can comprise a web connecting the first lobe and a second lobe.

The common outer jacket preferably has a thickness of at least 0.5 mm.

Preferably, the strength member is an electrically non-conductive metallic strength member.

The electric core can comprise power or telecommunication conductors or both. Example of telecommunication conductor is a copper pair or quad.

Advantageously, the first extruded inner sheath of the electric core houses two strength members, preferably positioned at diametrically opposed positions.

Preferably, a strength member is laid parallel to the first lobe longitudinal axis.

The optical core comprises at least one optical fibre (an optical glass waveguide surrounded by a curable polymeric coating), advantageously a plurality of optical fibres.

The optical core can further comprise dielectric elements for the protection of the optical fibre or fibres, such as water blocking material, fillers, tubes and the like.

BRIEF DESCRIPTION OF THE DRAWING

The present invention will become fully clear by reading the following detailed description, to be read by referring to the accompanying drawing, wherein:

FIG. 1 is a cross-sectional view of a cable assembly according to an embodiment of the present invention.

DESCRIPTION OF EXAMPLES

FIG. 1 is a cross-sectional view of a cable assembly according to an embodiment of the present invention. The cable assembly is generally designed by reference number 100.

Cable assembly 100 is an optical and electrical cable assembly and it comprises an optical core 21 and an electrical core 11. More specifically, cable assembly 100 is adapted for use as an aerial drop cable in FTTH applications.

In the present description and claims:
- the term "radial" is used to indicate a direction perpendicular to a reference longitudinal axis of the cable;
- the expressions "radially inner" and "radially outer" are used to indicate a position along a radial direction with respect to the above-mentioned longitudinal axis;
- a size along the radial direction is termed "thickness";
- the terms "conductive", "insulated" are used to mean "electrically conductive and "electrically insulated" respectively, unless otherwise specified;
- the term "electrically conductive" indicates a material, e.g. copper or aluminium, having an electrical resistivity lower than $10 \times 10^{-8}$ Ohm·m; preferably lower than $8 \times 10^{-8}$ Ohm·m; more preferably lower than $5 \times 10^{-8}$ Ohm·m.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The cable assembly 100 comprises a common figure-8 outer jacket 30 having a first lobe 10 and a second lobe 20.

First lobe 10 of the common figure-8 outer jacket 30 surrounds a first inner sheath 15 housing an electric core 11. The first inner sheath 15 is an extruded sheath made, for instance, of polyethylene, such as low density polyethylene (LDPE) or medium density polyethylene (MDPE) suitable to fulfil the requirement of BS EN 50290-2-23-2013. In embodiments, the first inner sheath 15 can have a thickness of from 0.3 mm to 0.6 mm. In one preferred embodiment, the thickness of the first inner sheath 15 is 0.4 mm.

In embodiments, the outer diameter of the first inner sheath 15 is of from 4.0 to 6.0 mm. For example, the outer diameter of the first inner sheath 15 is of about 5.0 mm.

In the depicted embodiment, the first inner sheath 15 houses an electric core 11 comprising three power conductors 12 and one copper pair 13.

Preferably, each of the power conductors 12 comprises an electrically conductive core and an electrically insulating layer thereabound. The electrically conductive cores can be made of copper or aluminium, preferably of copper.

The power conductors 12 are, typically, for low voltage application, i.e. suitable for transport current up to a voltage of less than about 1 kV.

The power conductors can be, for example, solid annealed bare copper of 0.5/0.9 mm fulfilling the requirement of the standard IEC 60228-2004 $3^{rd}$ ed.

Copper pair 13 or quad is suitable for data transport. Each copper pair 13 or quad comprises a twisted pair or quad of telecommunication conductors 13a, each comprising a copper wire covered by an electrical insulation layer made of polymeric material, for example polyethylene. The copper pairs or quads are stranded together and optionally wrapped by a tape 16 made of polymeric material, for example polypropylene.

It should be remarked that the number of power conductors and copper pairs may vary from the number shown in FIG. 1.

In case a plurality of power conductors 12 and/or copper pairs 13 are provided in the electric core 11, such conductors 12 and/or pairs 13 are profitably twisted together.

The power conductors and/or copper pairs can be wrapped together by a polymeric tape, for example of polyester. Such polymeric tape is in radially inner position with respect to the first inner sheath.

The first inner sheath 15 further houses members 14. The strength members 14 can be made of a non-metallic material or of an electrically non-conductive metallic material. An example of suitable non-metallic material is glass reinforced polymer. An example of suitable electrically non-conductive metallic material is steel or metal coated steel. Strength members in non-conductive metallic material are preferred, optionally coated with a polymeric material.

Preferably, the strength members 14 are provided in positions which are substantially radially opposed one to the other.

As the strength members are not embedded in the cable jacket, i.e. in the common figure-8 outer jacket, the cable will exhibit a reduced and more uniform flexibility. Also, as the strength members are not embedded in the cable jacket they are more easily accessible and this is important especially when the strength members are made of metallic material as they have to be earthed in case of short circuit test.

When an aerial cable comprises metallic strength members such as steel strength members, the cable could be requested to withstand a short circuit test, for example at 15 kV, where the metal strength members are earthed and the voltage is applied to the outside of the cable. In order to withstand this short circuit test a minimum of 0.75 mm of dielectric polymer (such as polyethylene) should be radially around the metallic strength members. In known cables where the metallic strength members are embedded in the cable jacket such a requirement implies increasing the jacket thickness and, accordingly, the cable dimensions.

In the cable assembly of the invention, as the metallic strength members are provided within the first inner extruded sheath there is more than 0.75 mm radial of dielectric polymer around the strength members. Accordingly, the radial thickness of the common figure-8 outer jacket does not have to be as high as in known cables thus making it easier to strip the jacket from the cable for releasing the electric and/or telecommunication self-standing cable.

In one embodiment strength members 14 may comprise one element of 3×0.41 mm brass coated steel strings, the element being coated with polyvinylchloride (PVC) to an overall diameter of 1.4 mm. In another embodiment, strength members 14 may comprise three elements of 3×0.25 mm brass coated steel strings; the element being coated with PVC to an overall diameter of 1.0 mm.

During deployment, the common figure-8 outer jacket is removed and the first inner extruded sheath housing the electric core and the strength member/s becomes a self-standing electric and/or telecommunication cable.

Second lobe 20 of the common figure-8 outer jacket 30 surrounds a second inner extruded sheath 25 housing an optical core 21. Optical core 21 comprises one or more optical fibers 22.

The second inner extruded sheath 25 is made, for instance, of polyethylene, such as low density polyethylene (LDPE) or medium density polyethylene (MDPE) suitable to fulfil the requirement of standard BS EN 50290-2-23-2013. In embodiments, the second inner sheath 25 can have a thickness of from 0.2 mm to 0.8 mm. In one preferred embodiment, the thickness of the second inner sheath 25 is 0.4 mm.

For example, the optical core (and the resulting self-standing optical cable) may comprise up to 24 optical fibers in loose configuration; 2, 4, 6, 8 or 12 optical fibers in EPFU (Enhanced Performance Fibre Unit) format for blown fibre applications; up to four tubes (modules or micromodules) each in turn containing 12 optical fibers; or up to two optical fibers each coated by yarns (for example, aramid yarns) surrounded by a polymeric protective jacket (patchcord format).

A water blocking material can be provided into radial internal position with respect to the second inner sheath 25 to prevent water or moisture to damage the optical fibers 22. The water blocking material can be in form of yarn, tape or gel.

The outer diameter of the second inner sheath 25 can be of from 2.0 to 3.0 mm. For example, the outer diameter of the second inner sheath 25 is 2.2 mm.

During deployment, the common figure-8 outer jacket is removed and the second inner extruded sheath housing the optical core becomes a self-standing optical cable.

As said above, the cable assembly 100 of the present invention comprises an outer common jacket 30. Outer common sheath 30 is provided radially outer the first inner sheath 15 and radially outer the second inner sheath 25. The outer common jacket 30 is substantially in a shape of "8" with a web 33 connecting a first lobe 10 which is radially external to the first inner sheath 15 and a second lobe 20 which is radially external to the second inner sheath 25.

Outer common jacket 30 may comprise, or may essentially consist of, a polyethylene. Preferably, outer common jacket 30 comprises, or essentially consists of, high density polyethylene (HDPE), preferably having a flexural modulus of 800-1400 MPa and a tensile Strain at Break (50 mm/min) of 900-1.500%. The HDPE polymer suitable for the outer common jacket of the present cable advantageously have an Environmental Stress Crack Resistance at 50° C. greater than 5000 h measured according to IEC 60811-4-1:2004.

Outer common jacket 30 can have a thickness of from 0.5 mm to 1.0 mm. For example, outer common jacket 30 has a thickness of 0.9-1.0 mm.

In the cable assembly of the invention, the outer common jacket should adhere to the underlying first and second inner sheaths in a sufficient manner to ensure a suitable mechanical congruence during operation, but should also be readily detachable from said sheaths to free the self-standing cables. To this end, the outer common jacket can be extruded over the first and second inner sheaths when the latters are already cooled down and/or carrying the extrusion under controlled temperature and pressure conditions known to the skilled ones. Alternatively, first and second inner sheaths can be spread with an anti-friction agent like chalk before the outer common jacket extrusion.

Web 33 can be 1.0 to 2.0 mm long.

At least one ripcord 32 can be embedded within the thickness of the outer common jacket 30. Preferably, two ripcords 32 are provided. The ripcords 32 are preferably arranged substantially opposed one to the other along the plane A-A'.

Preferably, the ripcords 32 are made of aramid, nylon or the like.

The cable assembly of the present invention can have small dimensions. For example, the assembly 100 can have a maximum radial width on the plane B-B' of 6.8 mm (across the first lobe 10; the width across the second lobe 20 can be of 4.0 mm) and a maximum radial width on the plane A-A' 12.3 mm.

The invention claimed is:

1. A cable assembly comprising:
   a figure-8 outer jacket comprising a first lobe and a second lobe;
   an electric core, two strength members, and a first extruded inner sheath housing said electric core and said two strength members, wherein the first lobe surrounds the first extruded inner sheath; and
   an optical core and a second extruded inner sheath housing said optical core, wherein the second lobe surrounds the second extruded inner sheath,
   wherein said electric core includes a plurality of power conductors, and
   wherein said electric core includes a telecommunication conductor.

2. The cable assembly of claim 1, wherein the figure-8 outer jacket embeds a rip-cord.

3. The cable assembly of claim 2, wherein the figure-8 outer jacket embeds a rip-cord per each first and second lobe.

4. The cable assembly of claim 3, wherein the rip-cord of the first lobe and the rip-cord of the second lobe are embedded into the figure-8 outer jacket at diametrically opposed positions.

5. The cable assembly of claim 1, wherein said first extruded inner sheath and second extruded inner sheath have a thickness of at least 0.2 mm.

6. The cable assembly of claim 1, wherein said figure-8 outer jacket comprises a web connecting the first lobe and the second lobe.

7. The cable assembly of claim 1, wherein said figure-8 outer jacket has a thickness of from 0.5 mm to 1.0 mm.

8. The cable assembly of claim 1, wherein the two strength members are positioned at diametrically opposed positions.

9. The cable assembly of claim 1, wherein each of the two strength members is laid parallel to a first lobe longitudinal axis.

10. The cable assembly of claim 9, wherein the two strength members are positioned at diametrically opposed positions.

11. The cable assembly of claim 1, wherein the optical core comprises a plurality of optical fibres.

12. The cable assembly of claim 11, wherein the optical core further comprises dielectric elements configured to protect the optical fibres.

13. A cable assembly comprising:
   a figure-8 outer jacket comprising a first lobe and a second lobe;

an electric core, a strength member, and a first extruded inner sheath housing said electric core and said strength member, wherein the first lobe surrounds the first extruded inner sheath; and an optical core and a second extruded inner sheath housing said optical core, wherein the second lobe surrounds the second extruded inner sheath, wherein the figure-8 outer jacket is removable, wherein the first extruded inner sheath constitutes a first self-standing cable when the figure-8 outer jacket is removed, and wherein the second extruded inner sheath constitutes a second self-standing cable when the figure-8 outer jacket is removed.

14. The cable assembly of claim 13, wherein the figure-8 outer jacket embeds a rip-cord.

15. The cable assembly of claim 13, wherein the figure-8 outer jacket embeds a rip-cord per each said first lobe and said second lobe.

16. The cable assembly of claim 13,
wherein the first extruded inner sheath houses said strength member and another strength member, and
wherein the strength members are positioned at diametrically opposed positions.

17. The cable assembly of claim 13, wherein said figure-8 outer jacket comprises a web connecting the first lobe and the second lobe.

18. The cable assembly of claim 13, wherein the optical core comprises a plurality of optical fibres.

19. The cable assembly of claim 13, wherein said electric core includes a plurality of power conductors.

20. The cable assembly of claim 13, wherein said electric core includes a telecommunication conductor.

* * * * *